United States Patent Office 2,853,484
Patented Sept. 23, 1958

2,853,484
METHOD OF PREPARING COLD SWELLING STARCH ETHERS AND/OR ESTERS

Jan Lolkema and Geert Moes, Hoogezand, Netherlands, assignors to Naamloze Vennootschap W. A. Scholten's Chemische Fabrieken Groningen, Netherlands, a corporation of the Netherlands No Drawing. Application November 14, 1955
Serial No. 546,767

Claims priority, application Netherlands
November 16, 1954

10 Claims. (Cl. 260—233.3)

U. S. patent Reissue 23,443 describes a method, in which starch or a high polymeric starch derivative is subjected to the so-called cold swelling starch process in the presence of water, an etherifying or esterifying agent and, if desired, an alkaline substance, either before or after the etherification or esterification has entirely or partly been effected. By the cold swelling starch process we understand a treatment, which consists in that a mixture of starch and water, preferably a limited amount of water, e. g. ½–2 parts by weight on 1 part by weight of starch, is heated for a very short time to an elevated temperature above the gelatinizing point, the mass being pressed out into thin layers under mechanical pressure and simultaneously or immediately thereafter dried.

This treatment is preferably carried out by applying the mixture to a rotating drying drum, which is heated to a temperature higher than the gelatinizing point of the starch, preferably a temperature ranging from about 100° to about 180° C., said drum being so arranged that by mechanical pressure the mass is pressed out or spread out into a thin layer. The starch or starch derivative is gelatinized thereby, if this has not yet been effected already during the pretreatment and it is dried simultaneously or immediately thereafter, so that the material coming from the drum consists of thin films or flakes, which may be ground to the desired flake size.

In said patent specification it is indicated that instead of with one etherifying or esterifying agent, as is usual, the starch may also be reacted with various etherifying agents or with etherifying and esterifying agents. In all of these cases the final products consist of etherified and/or esterified cold swelling starches, which for various purposes, have important advantages over the non-etherified or esterified starch products.

We have now found that valuable cold swelling starch ethers and/or esters are obtained, which have specific advantages over the known cold swelling starch ethers and/or esters for various applications, if in the process referred to above the starch or the high polymeric starch derivative is treated both with a bi- or polyfunctional agent and with a monofunctional etherifying or esterifying agent, the treatment with the bi- or polyfunctional agent being applied to the starch in non-gelatinized form, whereas during the treatment with the monofunctional etherifying or esterifying agent the starch or starch derivative may be either gelatinized or not.

The method according to the invention, therefore, consists in that starch or a high polymeric, not yet gelatinized starch derivative is treated in any desired sequence both with a bi- or polyfunctional agent and with a monofunctional etherifying and/or esterifying agent under such conditions that during the treatment with the bi- or polyfunctional agent the starch granules are not substantially gelatinized, and that the reaction mass is subsequently subjected to the cold swelling starch process in the presence of the proportion of water required for said process.

A bi- or polyfunctional agent is understood to be a substance which is capable of reacting with two or more hydroxyl groups of the starch. For the sake of convenience the bi- or polyfunctional agent will be indicated as a "polyfunctional agent," the monofunctional etherifying or esterifying agent as a "monofunctional agent." Both for starch and for high molecular, non-gelatinized starch derivatives the term "starch" will be used.

The method according to the invention is preferably carried out by first treating the starch in non-gelatinized condition with the polyfunctional agent and subsequently in gelatinized condition with the monofunctional agent, whereupon the reaction product is subjected to the cold swelling starch process described hereinbefore. However, the treatment with the monofunctional agent may likewise be applied to the starch in non-gelatinized condition, prior to, simultaneously with or after the treatment of the starch with the polyfunctional agent. Preferably, however, the treatment with the monofunctional agent is also in this case effected after the treatment with the polyfunctional agent.

The starch treated both with a mono and with a polyfunctional agent may be subjected either in purified or in unpurified condition to the cold swelling starch process. In case the treatment with the poly and with the monofunctional agent have both been applied to ungelatinized starch and if the starch has not become too strongly swollen by the treatment, the purification may be effected in a simple maner by washing with water. The treated starch, however, may also be gelatinized with water, if during the treatment a gelatinization has not yet occured and then be precipitated, e. g. by means of organic solvents or inorganic salts, filtered off and further purified in known manner. Thereupon the purified product is subjected in the presence of the required desired proportion of water to the cold swelling starch process.

If during the treatment with the monofunctional and/or with the polyfunctional agent ionogenic carboxyl groups are introduced into the starch, the precipitation and purification of the treated starch may also be effected by means of aluminum salts, e. g. alum. The product precipitated and purified by means of an aluminum salt is subsequently dissolved with the desired amount of an alkaline compound, e. g. soda or caustic soda and subsequently subjected to the cold swelling starch process.

It should be noted that the purification may take place either after the treatment with the polyfunctional agent or after the treatment with the monofunctional agent or after both treatments.

For most commercial purposes a purification of the etherified or esterified starch is not necessary and the reaction mixture is then subjected in its entirety to the cold swelling starch process. Sometimes, however, it has advantages after the treatment with the polyfunctional agent to remove any reactants that have not reacted and are still present in the starch, before reacting the starch with the monofunctional etherifying or esterifying agent, more particularly, if the last mentioned treatment is applied to gelatinized starch.

In other cases, however, it may be useful not to remove the non reacted polyfunctional agent by washing or even to add a small amount of polyfunctional agent which should react with the gelatinized starch just as the monofunctional agent. In this case the action of the polyfunctional and of the monofunctional agent may take place simultaneously or not.

The reaction with the monofunctional agent may proceed before or during the conversion of the starch, which has been treated in non-gelatinized condition with the polyfunctional agent, into cold swelling starch. In most cases a substantial etherification or esterification of the starch with the monofunctional agent has already taken place prior to the cold swelling starch process proper; the method is preferably so carried out that the reaction has proceeded for three quarters or more before the heating and drying on the drums takes place.

The ratio between the proportions of mono and polyfunctional reactant used may vary within wide limits, but should always be such that all or substantially all of the starch granules of the final product have lost their morphological shape. Dependent on the ratio of polyfunctional and monofunctional agent used all or substantially all of the starch granules may have been entirely or only partly disintegrated. This ratio is preferably so chosen, that an aqueous dispersion of the cold swelling starch ether and/or ester obtained substantially consists of starch granules that have only been partly disintegrated.

For the method according to the invention we may use in the first place raw starches, e. g. potato starch, maize starch, cassave starch, wheat starch, sago starch, waxy starches, and the like. However, we may also use degraded starch products, such as thin boiling starch or dextrin. As the risk of gelatinization increases in accordance with the degree of degrading of the starch, it is generally preferred first to treat the starch with the polyfunctional agent and only thereafter to degrade it to the desired degree.

The cold swelling starch ethers and/or esters according to the invention may also be obtained from products, which besides starch also contain other substances, e. g. from natural or artificial mixtures of starch or starch derivatives with protein or protein and cellulose, such as wheat, rye or buckwheat flour, ground cassave or manioc roots, or the like.

The polyfunctional agents, suitable for the purpose of the invention, may be of various nature. Examples of such agents are: polyfunctional etherifying or esterifying agents, such as glycerol dichlorohydrin, epichlorohydrin, $\beta\beta'$-di-chlorodiethyl ether, butadiene dioxide, phosphorus oxychloride, hexamethylene di-isocyanate and toluene di-isocyanate, synthetic resin precondensates, such as dimethylolurea, dimethylol acetone and trimethylol melamine and aldehydes, such as formaldehyde and glyoxal.

Examples of suitable monofunctional agents are the well known monofunctional etherifying and esterifying agents, such as halogenated fatty acids, e. g. chloroacetic acid and bromopropionic acid, halogen hydrins, e. g. ethylene chlorohydrin, propene chlorohydrin, glycerol monochlorohydrin, reactive epoxyalkanes, e. g. epoxyethane, 1,2 epoxypropane, 1,2 epoxy-3-propanol, cyclohexane oxide and styrene oxide, dialkylsulphates, e. g. dimethyl sulphate and diethyl sulphate, alkyl halides, e. g. methyl chloride and ethyl iodide, chloro-ethylene sulphonic acid, chlorohydroxy propane sulphonic acid, epoxy propane sulphonic acid, ethylene sulphonic acid, p-benzylchloride sulphonic acid, glycidic acid, ethylene imine, acrylonitrile, acetic acid anhydride, $\beta$-propiolactone, poly-basic acid anhydrides, e. g. phthalic acid, succinic acid or maleic acid anhydride, chlorosulphonic acid, benzylchloride, benzoylchloride, p-toluene sulphochloride, aliphatic and aromatic monoisocyanates and the like.

The treatment of the starch with the poly and the monofunctional agent may be effected in known manner both by the wet and by the dry method in the presence of substances, which promote the reaction of said agents with starch. Said substances may be of an alkaline, neutral or acid nature. The agents to be applied may, if desired, be diluted with a solvent and also the reaction with the starch may also be allowed to proceed in an organic solvent. Instead of with one polyfunctional agent the starch can also be treated with two or more polyfunctional agents, which may be of the same or of a different nature, e. g. an etherifying agent and an esterifying agent. The same also applies to the monofunctional agent. In all of these cases the mono and polyfunctional agents may be added either simultaneously or successively in any desired sequence, immediately after one another or after a certain lapse of time.

As a result of the special treatment, which the starch has undergone, the cold swelling starch ethers and/or esters according to the invention have specific properties. As compared with the cold swelling starch ethers and esters prepared by conventional methods products may be obtained, which have a considerably higher viscosity, but which nevertheless are excellently dispersible or soluble in cold water, even in low concentrations, to smooth pastes or solutions. Said pastes or solutions only become slowly thinner upon the addition of water and are characterized by a remarkable resistance against mechanical influences (agitation, pumping and the like).

For many technical purposes the new products, therefore, have characteristic and valuable properties, e. g. as sizing agents and as printing paste thickening agents in the textile industry. Owing to the fact that the products are easily washed out, the sizing or thickening agents may be readily removed from the fabric after the sizing and weaving or the printing. In addition the prints obtained are characterized by a high colour yield. Furthermore the products can be used as finishing agents, as laundry starches, as printing paste thickeners in the paper industry, as protective colloids in drilling muds, as paper sizes and as adhesives and binding agents for all kinds of powdered, granular of fibrous materials.

Moreover a great number of products according to the invention, more particularly those which prior to the conversion into cold swelling starch have undergone a purification process, may be used in foodstuffs e. g. as constituents of ice cream or pudding powders, as a binder or stabilizer in salad dressing, cholocate milk, fruit-squashes and the like.

The invention will be illustrated with reference to the following examples.

Example I 3.5 parts by weight of glycerol dichlorohydrin are added to a suspension of 1000 parts by weight of potato starch in 1000 parts by weight of a 0.15 normal caustic soda solution. The suspension is stirred for three hours at a temperature of 50° C., whereupon 290 parts by weight of monochloro acetic acid sodium and 360 parts by weight of a 9 normal caustic soda solution are added.

The reaction mass is then heated for 90 minutes to a temperature of 80–90° C. and pressed out on a heated drum into thin layers and dried. The dry product is grounded to the desired flake size.

1 part by weight of the carboxymethyl ether of cold swelling starch thus prepared readily dissolves in 15 parts by weight of cold water to transparent, unctuous paste, which is very stable against mechanical agitation and which upon the addition of water becomes only slowly thinner.

Example II

To a suspension of 2000 parts by weight of potato starch in 2000 parts by weight of a 0.15 normal caustic soda solution 5 parts by weight of glycerol dichlorohydrin are added, whereupon the suspension is agitated for three hours at a temperature of 40–50° C. The suspension is subsequently filtered on a vacuum filter and washed with water a few times.

The starch product thus obtained is dispersed in 2000 parts by weight of hot water and converted into an alkali starch paste by intimately mixing it with 260 parts by weight of a 9 normal caustic soda solution. The alkali starch paste is agitated in the heat for such a time that the mass has become entirely smooth, whereupon at a temperature of 40–60° C. in the course of 20 minutes 440 parts by weight of the epoxyethane are introduced. After the addition of the epoxyethane the reaction mixture is agitated for an hour in the heat, neutralized and dried in a thin layer of a heated rotating cylinder, the dry product being ground. 1 part by weight of the cold swelling starch hydroxyalkyl ether thus obtained readily dissolves in 8 parts by weight of cold water to form a viscous, transparent, gummy paste.

Example III

To a suspension of 2000 parts by weight of thin boiling potato starch in 3000 parts by weight of a 0.16 normal caustic soda solution 2 parts by weight of 1.2–3.4 diepoxybutane are added, and the suspension is stirred for four hours at 30–40° C. After cooling to room temperature 360 parts by by weight of β-propiolactone are added in the course of 60 minutes. During the dropwise addition of the lactone the suspension is kept alkaline by the addition of dilute caustic soda solution. After the addition of the second agent the suspension is stirred for another thirty minutes and subsequently subjected to the cold swelling starch process on a heated rotating cylinder. 1 part by weight of the cold swelling starch ester thus obtained, gives a medium viscous, transparent, very stable paste, when dissolved in 5 parts by weight of cold water.

Example IV 1 part by weight of phosphorusoxychloride is added to a suspension of 2000 parts by weight of cassave starch in 3000 parts by weight of a 0.15 normal caustic soda solution with energetic stirring. The suspension is agitated for half an hour at room temperature, whereupon the concentration of the caustic soda solution is increased to 0.2 normal. While raising the temperature to 35–40° C. 200 parts by weight of 1.2-epoxy-3-propanol are added dropwise to the suspension in the course of 45 minutes. After the addition of the 1.2-epoxy-3-propanol the suspension is stirred for 5 hours at the same temperature (35–40° C.), whereupon it is neutralized with dilute hydrochloric acid and subsequently centrifuged, the filter cake being thoroughly washed with water.

Said filter cake is now dispersed in twice the amount of water; the suspension is pressed out into a thin layer on a heated rotating roller and dried.

The mixed ether-ester of cold swelling starch thus obtained, which is ground so finely, that at least 80% of the product will pass through a screen having 200 meshes per inch, is particularly suited for the preparation of custard and pudding powder and as a binder for various sauces.

Example V 1000 parts by weight of potato starch are dispersed in 1200 parts by weight of water, in which previously 5 parts by weight of dimethylolurea have been dissolved. After the suspension has been adjusted to a pH of 4 by means of dilute phosphoric acid, it is stirred for three hours at a temperature of 45–50° C. Subsequently 130 parts by weight of a 10 normal caustic soda solution are added and the bath temperature is raised to 60° C. In the alkali starch paste obtained 100 parts by weight of epoxyethane are introduced in the course of about 20 minutes, whereupon the reaction mass is heated for another 40 minutes. After neutralization with 10 normal hydrochloric acid the mass is converted into cold swelling starch on a heated rotating cylinder. 1 part by weight of the cold swelling starch hydroxyethyl ether obtained will give a viscous, transparent paste, when dissolved in 8 parts by weight of water.

Example VI 25 parts by weight of a 40% caustic soda solution are intimately mixed with 1000 parts by weight of maize starch. 1.5 parts by weight of epichlorohydrin are added and the mixture is heated in a closed vessel for 1 hour to about 60° C. The reaction product obtained is dispersed in 1200 parts by weight of water and 290 parts by weight of monochloro acetic acid sodium and 360 parts by weight of a 9 normal caustic soda solution are subsequently added, whereby the starch is gelatinized. The temperature of the liquid in the heating jacket of the reaction vessel is now raised in the course of about 20 minutes to 70–80° C., and the reaction mass is allowed to react for another 90 minutes. Thereupon the reaction mixture is pressed out into a thin layer and simultaneously dried on a heated rotating drum and the dried product obtained is ground to the desired degree of fineness. 1 part by weight of the cold swelling starch ether thus obtained very rapidly dissolves in cold water and with 10 parts by weight of water gives an unctuous smooth paste, which upon the addition of water becomes only slowly thinner and has a great stability against mechanical influences.

Example VII 1000 parts by weight of potato starch are dispersed in 1200 parts by weight of water and the suspension is adjusted to a pH of 11.6 by means of a caustic soda solution. 5 parts by weight of phosphorusoxychloride are added dropwise in the course of some minutes at room temperature with intensive mixing, the pH of the suspension being meanwhile kept between 11 and 12 by means of dilute caustic soda solution.

After the addition of the polyfunctional agent the suspension is stirred 1 hour at room temperature.

To the potato starch suspension thus pretreated 100 parts by weight of a 10 normal caustic soda solution are added and thereupon 175 parts by weight of 1.2-epoxy-3-propanol are added in the course of about 20 minutes. During the addition of the 1.2-epoxy-3-propanol the temperature of the heating jacket is slowly raised to 60° C. After the addition of the monofunctional agent the reaction mass is stirred for another 75 minutes, the temperature of the bath being gradually increased from 60 to 80° C. At the end of the heating the reaction mixture is neutralized with concentrated hydrochloric acid and subsequently brought in dry form on a heated drum.

1 part by weight of the cold swelling starch hydroxyalkyl ether thus produced with 7 parts by weight of cold water gives a smooth, unctuous, transparent paste.

We claim:

1. A process for the manufacture of dry cold water soluble gelatinized starch products which comprises treating a granular starch material with a polyfunctional agent reacting with at least two hydroxyl groups of the starch molecules, while maintaining said starch material in ungelatinized condition, gelatinizing the starch material so treated and reacting the same with a reagent selected from the class consisting of monofunctional etherifying agents and monofunctional esterifying agents, heating and simultaneously drying the reaction mass in a thin layer at a temperature of between about 70° C. and 180° C., thereby producing a starch product in which substantially all of the starch granules are at least partially ruptured, and comminuting the film thus obtained to small flakes.

2. A process according to claim 1 in which the polyfunctional agent is an etherifying agent.

3. A process according to claim 1 in which the polyfunctional agent is an esterifying agent.

4. A process according to claim 1 in which the monofunctional etherifying agent is a halogen fatty acid.

5. A process according to claim 1 in which the monofunctional etherifying agent is an alkylene oxide.

6. A dry cold water dispersible starch material comprising thin drum dried flakes containing reaction products of starch both with a polyfunctional agent and with a reagent selected from the class consisting of monofunctional etherifying agents and monofunctional etherifying agents and monofunctional esterifying agents, which when stirred with cold water forms a colloidal dispersion of starch, in which substantially all starch granules have been disintegrated into swollen fragments.

7. A dry cold water dispersible starch material according to claim 6, in which the polyfunctional agent is an etherifying agent and in which the monofunctional etherifying agent contains a carboxylic acid group.

8. A dry cold water dispersible starch material according to claim 6, in which the polyfunctional agent is an etherifying agent and in which the monofunctional etherifying agent contains a sulfonic acid group.

9. A dry cold water dispersible starch material according to claim 6, in which the polyfunctional agent is an etherifying agent and in which the monofunctional etherifying agent is an alkylene oxide.

10. A dry cold water dispersible starch material according to claim 6, in which the polyfunctional agent is an esterifying agent and in which the monofunctional etherifying agent is an alkylene oxide.

References Cited in the file of this patent

UNITED STATES PATENTS

| Re. 23,443 | Lolkema | Dec. 18, 1951 |
| 2,148,951 | Maxwell | Feb. 28, 1939 |
| 2,500,950 | Konigsberg | Mar. 21, 1950 |